US006720380B2

(12) United States Patent
Hellmann et al.

(10) Patent No.: US 6,720,380 B2
(45) Date of Patent: Apr. 13, 2004

(54) MODULAR SYSTEM FOR COATING PLASTICS

(75) Inventors: Udo Hellmann, Remscheid (DE); Maria Weigel, Wuppertal (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 72 days.

(21) Appl. No.: 09/995,384

(22) Filed: Nov. 27, 2001

(65) Prior Publication Data

US 2003/0105230 A1 Jun. 5, 2003

(51) Int. Cl.[7] .................... C09D 133/14; C09D 167/02; C09D 175/04

(52) U.S. Cl. ........................ 524/507; 524/513; 524/519; 524/523; 524/539; 525/108; 525/111; 525/125; 525/131; 525/166; 525/169; 525/170; 525/176; 525/939

(58) Field of Search ................................. 525/166, 169, 525/170, 176, 125, 131, 108, 111, 939; 524/507, 513, 519, 523, 539

(56) References Cited

U.S. PATENT DOCUMENTS

| 5,523,336 A | | 6/1996 | Schreiber et al. |
| 5,672,649 A | * | 9/1997 | Brock ........................ 524/507 |

* cited by examiner

*Primary Examiner*—Patricia A. Short
(74) *Attorney, Agent, or Firm*—Steven C. Benjamin

(57) ABSTRACT

The invention relates to a modular system for the production of coating compositions for coating plastics comprising the following component modules:

A) at least one base module containing at least one binder, extenders and/or pigments, optionally together with conventional coating additives, water and/or organic solvents, B) at least one adhesion module containing at least one adhesion-promoting component optionally together with binders, conventional coating additives, extenders, organic solvents and/or water, C) at least one elasticity module containing at least one elasticising component optionally together with conventional coating additives, extenders, organic solvents and/or water and D) at least one binder module containing at least one binder optionally together with additives, organic solvents and/or water.

13 Claims, No Drawings

MODULAR SYSTEM FOR COATING PLASTICS

FIELD OF THE INVENTION

The invention relates to a modular system comprising various component modules for the production of coating compositions for coating plastics and to a process for the production of coating compositions using this modular system. The modular system and the process may be used in vehicle and industrial coating, in particular in vehicle repair coating.

DESCRIPTION OF RELATED ART

In vehicle construction, in addition to the usual metals, increased use is also being made of plastics for various vehicle parts and attachments, such as for example external mirror casings, bumpers, spoilers, trim strips etc. The plastics used are, for example, polyolefins, such as polypropylene, polystyrene, polycarbonate, ABS (acrylonitrile/butadiene/styrene copolymers), polyamide, polymer blends prepared from the stated plastics and glass fibre reinforced plastics. However, when coating plastics parts, problems with adhesion to the substrate occur to a greater or lesser degree depending upon the plastic used. Non-polar plastics, such as for example polypropylene, require adhesion-promoting pretreatment and/or specially developed adhesion primers in order to be coatable at all.

In order to achieve optimum adhesion results on various plastics substrates, adhesion-promoting coating compositions, known as adhesion primers, tailored to the particular plastic have been developed and these are applied as the first layer on the plastics surface where they are intended to ensure adhesion of the complete coating structure to the plastic. So that the product range required for this purpose may be limited in size on economic grounds, the industry has already changed over to developing "general purpose" products which achieve at least adequate adhesion on all plastics substrates which may, in principle, be coated.

Such general purpose adhesion primers are described, for example, in DE-A-44 05 148 (U.S. Pat. No. 5,523,336). The adhesion primers described in said document are waterborne coating compositions and contain water-dilutable self-emulsifying epoxy resins and chlorinated polyolefins.

However, the generally satisfactory overall level of properties achievable with these general purpose products does not always adequately meet the specifications placed upon coating products, for example by automotive manufacturers.

In particular in vehicle coating and vehicle repair coating, there is accordingly a need for coating compositions for coating plastics, which compositions on the one hand exhibit good, general purpose adhesion to the various plastics substrates and simultaneously meet the automotive industry's specifications with regard to the overall range of properties. The coating compositions should thus achieve good to very good results in a series of specific tests, such as the condensed water test, breakdown test, stone impact test, steam jet test, crosscut test, alternating temperature test.

SUMMERY OF THE INVENTION

The present invention provides a modular system comprising individual constituent modules, which system, by the combination of various module units, permits the production of coating compositions with good adhesion which meet the particular requirements placed upon them and thus satisfies the above-stated need.

The invention relates to a modular system for the production of coating compositions for coating plastics comprising the following component modules:
A) at least one base module containing at least one binder, extenders and/or pigments, optionally together with conventional coating additives, water and/or organic solvents,
B) at least one adhesion module containing at least one adhesion-promoting component optionally together with binders, conventional coating additives, extenders, organic solvents and/or water,
C) at least one elasticity module containing at least one elasticising component optionally together with conventional coating additives, extenders, organic solvents and/or water and
D) at least one binder module containing at least one binder optionally together with additives, organic solvents and/or water.

DETAILED DESCRIPTION OF THE EMBODIMENTS

The modular system according to the invention may additionally contain further modules. The further modules which may be present comprise, for example
E) at least one crosslinking agent module containing at least one crosslinking agent optionally together with conventional coating additives, organic solvents and/or water.

The conventional coating additives optionally present in modules A), C), D) and E) should exclude adhesion promoters for coating plastics as these adhesion promoters are present separately in the adhesion module B). Modules are taken to be storage-stable, separately storable units from which finished coating compositions may be produced by suitable combination or which themselves constitute a finished coating composition. By combining various modules A) to E) it is possible to obtain coating compositions having properties tailored to the specific requirements of each plastic. The modules may be supplied to the user for example in the form of a kit, for example in suitable containers such as canisters, cans or bottles.

The modular system according to the invention may be used for the production of aqueous or solvent-based coating compositions.

Waterborne or solvent-based modules adapted to the particular intended application must accordingly then be prepared.

The base module A) is a preparation which contains at least one binder, extenders and/or pigments, optionally together with conventional coating additives, water and/or organic solvents. The base module preferably contains:
A1) 10 to 25 wt-% of at least one binder,
A2) 25–40 wt-% of at least one pigment and/or extender and optionally
A3) 0.5–5 wt-% of at least one conventional coating additive and/or
A4) 30–60 wt-% of at least one organic solvent and/or water, wherein the weight percentages relate to solids content and the sum of weight percentages of A1) to A4) is 100 wt-%.

Conventional film-forming binders, as are known to the person skilled in the art for the production of coating compositions, in particular in the vehicle coating sector, may be used as component A1) in the base module A). The binders may be water-dilutable or solvent-based binders. If a waterborne modular system is to be prepared, water-dilutable binders are used, while if a solvent-based modular system is to be prepared, solvent-based binders are generally used. Conventional water-dilutable or solvent-based polyurethanes, poly(meth)acrylates, polyesters, alkyd resins and epoxy resins may be considered for this purpose. The binders may be physically drying, but crosslinkable binders equipped with suitable functional groups are preferably used. When selecting the functional groups or when selecting the crosslinking agent, care must be taken to ensure that the only binder/crosslinking agent systems selected are those which do not require excessively high crosslinking temperatures, as, due to the temperature-sensitivity of the substrates, temperatures in excess of 100° C. should be avoided in plastics coating. In the case of use in vehicle repair coating, binder/crosslinking agent systems should be selected which are suitable for the curing temperatures conventional in repair coating, for example of 20–80° C., preferably of 20–60° C.

In the case of water-dilutable binders, the binders conventionally contain ionic groups or groups capable of forming ions and/or nonionic groups in order to achieve sufficient water dilutability. Groups capable of forming anions which may be considered are for example carboxyl, phosphoric acid and sulfonic acid groups. Groups capable of forming cations which may be considered are for example primary, secondary and tertiary amino groups or onium groups, such as quaternary ammonium, phosphonium and/or tertiary sulfonium groups. The ionic groups are then neutralised with suitable bases or acids. Examples of suitable nonionic groups are alkylene oxide groups, such as ethylene oxide and propylene oxide groups. Alternatively or in addition to modifying the binders with the stated ionic and/or nonionic groups, it is possible to achieve water dilutability of the binders by means of external emulsifiers.

Examples of crosslinkable functional groups present in the binders A1) are hydroxyl, isocyanate, acetoacetyl, olefinically unsaturated groups, such as (meth)acryloyl groups, epoxy, carboxyl and amino groups. The binders A1) preferably contain hydroxyl groups as crosslinkable functional groups.

Binders containing hydroxyl groups which may be used individually or in combination are, for example, polyurethanes, polyesters and poly(meth)acrylates. These resins generally have a hydroxyl value of 20 to 250 mg of KOH/g and may optionally additionally be modified. Hydroxy-functional poly(meth)acrylates are preferably used, particularly preferably poly(meth)acrylate resins having hydroxyl values of for example 80 to 200 mg of KOH/g, acid values of 0–150 mg of KOH/g, preferably of 0–100 mg of KOH/g and amine values of 0–150 mg of KOH/g, preferably of 0–100 mg of KOH/g. The acid value and/or amine value must be adjusted so as to ensure sufficient water dilutability of the poly(meth)acrylate resins. The hydroxy-functional poly(meth)acrylate resins have a preferred number average molecular weight Mn of 1000–20000, particularly preferably of 1000–10000.

(Meth)acrylate und (meth)acrylic should be understood here and hereinafter to mean acrylate and/or methacrylate, and acrylic and/or methacrylic.

The preferably usable poly(meth)acrylate resins containing hydroxyl groups are produced by free-radical polymerisation of olefinically unsaturated monomers.

Free-radically polymerisable monomers which may be considered are virtually any olefinically unsaturated monomers as are usual in free-radical polymerisation. In addition to hydroxy-functional unsaturated monomers, the monomers may comprise unsaturated monomers with further functional groups, for example carboxyl groups or glycidyl groups, together with conventional unsaturated monomers without further functional groups.

Suitable olefinically unsaturated monomers with hydroxyl groups are, for example, hydroxyalkyl esters of $\alpha,\beta$-unsaturated carboxylic acids with primary or secondary hydroxyl groups. Preferred hydroxyalkyl esters are those of acrylic acid or methacrylic acid with aliphatic diols having 2–20 C atoms. Examples of such hydroxyalkyl esters with a primary hydroxyl group are hydroxyethyl (meth)acrylate, hydroxypropyl (meth)acrylate, hydroxybutyl (meth)acrylate, hydroxyamyl (meth)acrylate, neopentyl glycol mono(meth)acrylate, hydroxyhexyl (meth)acrylate, hydroxyoctyl (meth)acrylate. Examples of hydroxyalkyl esters with a secondary hydroxyl group are 2-hydroxypropyl (meth)acrylate, 2-hydroxybutyl (meth)acrylate, 3-hydroxybutyl (meth)acrylate. It is, however, also possible to use the corresponding esters of other unsaturated carboxylic acids, such as for example of crotonic acid or isocrotonic acid.

Another group of OH-functional, unsaturated monomers comprises hydroxyalkylamides of unsaturated carboxylic acids, such as for example of acrylic acid, methacrylic acid and fumaric acid. Examples of these are N-hydroxyethylmethacrylic acid amide, N-(2-hydroxypropyl)methacrylamide or N-hydroxyalkylfumaric acid mono- or diamide. Further suitable compounds are also reaction products prepared from 1 mol of hydroxyalkyl (meth)acrylate and 2 mol of a lactone, preferably epsilon-caprolactone, and addition products of (meth)acrylic acid and glycidyl esters of saturated monocarboxylic acids, which are branched in alpha position and have 5–15 C atoms per molecule, preferably addition products with glycidyl esters of saturated alpha,alpha-dialkylalkane monocarboxylic acids with 5–13, preferably 9–11 C atoms per molecule, for example glycidyl esters of versatic acid.

Other unsaturated compounds containing hydroxyl groups are allyl alcohol, monovinyl ethers of polyalcohols, especially of diols such as for example the monovinyl ether of ethylene glycol or butanediol, allyl ethers or esters containing hydroxyl groups such as 2,3-dihydroxypropyl monoallyl ether, trimethylolpropane monoallyl ether or 2,3-dihydroxypropanoic acid allyl ester and glycerol mono (meth)acrylate.

Particularly suitable compounds are hydroxyethyl (meth)acrylate, hydroxypropyl (meth)acrylate and hydroxybutyl (meth)acrylate.

Further comonomers which may be used are unsaturated monomers without further functional groups. Examples of these are esters of $\alpha$, $\beta$-unsaturated monocarboxylic acids with aliphatic monohydric branched or unbranched and cyclic alcohols having 1–20 C atoms. These preferably comprise esters of acrylic acid or methacrylic acid. Examples of esters with aliphatic alcohols are methyl acrylate, ethyl acrylate, isopropyl acrylate, tert.-butyl acrylate, n-butyl acrylate, isobutyl acrylate, 2-ethylhexyl acrylate, lauryl acrylate, stearyl acrylate and the corresponding methacrylates. Examples of esters with cyclic alcohols are cyclohexyl (meth)acrylate, trimethylcyclohexyl (meth)acrylate, 4-tert.-butylcyclohexyl (meth)acrylate and isobornyl (meth)acrylate.

Further unsaturated monomers are, for example, vinyl aromatic monomers such as styrene, alpha-methylstyrene and vinyl esters, such as vinyl acetate or vinyl esters of monocarboxylic acids which are branched in alpha position and have 5–15 C atoms per molecule, preferably vinyl esters of saturated alpha,alpha-dialkylalkane monocarboxylic acids having 5–13, preferably 9–11 C atoms per molecule. Ethylenically polyunsaturated monomers may, however, also be used. These are monomers having at least 2 free-radically polymerisable double bonds. Examples of these are divinylbenzene, 1,4-butanediol diacrylate, 1,6-hexanediol diacrylate, neopentyl glycol dimethacrylate, glycerol dimethacrylate. A proportion of monomers containing carboxyl groups and/or amino groups may also be incorporated by polymerisation. Examples of monomers containing carboxyl groups are α,β-unsaturated carboxylic acids, such as for example acrylic acid, methacrylic acid, itaconic acid, crotonic acid and semi-esters of maleic and fumaric acid. Suitable amine-functional monomers are ω-di(C1–C4) alkylamino (C1–C18)alkyl (meth)acrylates and (meth)acrylamides. Examples are N(N,N-diethylaminopropyl) (meth)acrylamide, N(N,N-dimethylaminopropyl) (meth)acrylamide, N(N,N-dimethylaminoethyl) (meth)acrylamide, N-methylaminopropyl (meth)acrylamide, N-ethylaminopropyl (meth)acrylamide, N,N-diethylaminopropyl (meth)acrylate, N,N-dimethylaminoethyl (meth)acrylate, N-methylaminoethyl (meth)acrylate, N-ethylaminopropyl (meth)acrylate.

The individual monomers are here used in quantities such that the desired hydroxyl and optionally acid or amine values are obtained.

The preferred hydroxy-functional poly(meth)acrylates may be used in combination with further hydroxy-functional resins, for example hydroxy-functional polyesters and/or hydroxy-functional polyurethanes.

Conventional organic or inorganic colour-imparting pigments and/or extenders as are known to the person skilled in the art for the production of coating compositions, in particular in the vehicle coating sector, may be considered as component A2) in the base module. Examples of pigments are titanium dioxide, micronised titanium dioxide, iron oxide pigments, carbon black, azo pigments, phthalocyanine pigments, quinacridone and pyrrolopyrrole pigments. Examples of extenders are silicon dioxide, aluminium silicate, aluminium oxide, barium sulfate and talcum.

Conventional coating additives may be present in the base module as component A3). The additives comprise the conventional additives usable in the coating sector, in particular in fillers and primers. Examples of such additives are levelling agents, for example based on (meth)acrylic homopolymers or silicone oils, anticratering agents, antifoaming agents, catalysts, dispersing agents, thickeners and emulsifiers.

Organic solvents and/or water may be present in the base module as component A4). Organic solvents comprise conventional coating solvents. These may originate from the production of the binders and/or are added separately. Examples of such solvents are mono- or polyhydric alcohols, for example propanol, butanol, hexanol; glycol ethers or esters, for example butyl glycol, butyl diglycol, diethylene glycol dialkyl ethers, dipropylene glycol dialkyl ethers, ethyl glycol acetate, butyl glycol acetate, butyl diglycol acetate, esters, such as for example butyl acetate, isobutyl acetate, amyl acetate, glycols, for example ethylene glycol, propylene glycol and oligomers thereof, N-methylpyrrolidone, and ketones, for example methyl ethyl ketone, acetone, cyclohexanone; aromatic or aliphatic hydrocarbons, for example toluene, xylene, or linear or branched aliphatic C6–C12 hydrocarbons. In the case of a modular system for the production of aqueous coating compositions, if organic solvents are necessary, it is preferred to use water-miscible organic solvents.

The base module A) generally has a weight ratio of extenders and pigments to binders of preferably 1.6:1–3.0:1, particularly preferably of 1.7:1–2.7:1.

The base module A) is preferably used in combination with at least one further module, i.e. the base module A) is first combined with at least one of the above-stated modules to yield a finished coating composition. Due to its comparatively high extender/pigment:binder ratio, the base module A) is not ideally suited for use directly as a finished coating composition, in particular as a primer.

One possible embodiment of the invention involves additionally preparing a second base module with a lower extender/pigment:binder ratio than described above. This base module which may optionally be present in addition to the actual base module A) may be designated base module AII). Base module AII) preferably exhibits a pigment/extender:binder ratio of 1.2:1–1.6:1. Due to its composition, in particular its pigment/extender:binder ratio, base module AII) is suitable and is also in particular intended for direct use as a finished coating composition without being combined with further modules, with the exception of the crosslinking agent module E).

The adhesion module B) is a preparation which contains at least one adhesion-promoting component optionally together with at least one binder, conventional coating additives, extenders, organic solvents and/or water.

The adhesion-promoting component comprises those adhesion-promoting or adhesion-improving compounds which are known to the person skilled in the art for the formulation in particular of adhesion primers for coating plastics. Widely used adhesion-promoting components, known in brief as adhesion additives, comprise, for example, chlorinated polyolefins, such as for example chlorinated polyethylene, chlorinated polypropylene, chlorinated polyethylene/polypropylene copolymers or mixtures thereof. The chlorinated polyolefins generally exhibit a degree of chlorination of 15–45 wt-% and may assume the form of a powder, a solution in organic solvents or an aqueous dispersion. The chlorinated polyolefins may, for example, assume the form of a solution in hydrocarbons, preferably aromatic hydrocarbons. The solids content of solutions of chlorinated polyolefins may be, for example, 18–60 wt-%. The stated products are known to the person skilled in the art and are commercially available, for example from Eastman. Chlorinated polyolefins may also be used as an aqueous dispersion, obtainable for example under the trade name Trapylen 6950 W (Tramaco). Non-chlorinated products may furthermore also be used as adhesion promoters, for example the product Eastman AP 440-1 (25% in xylene, Eastman).

The adhesion module B) may also contain a portion of binder. The binders may here comprise those binders as have already been described above in the description of the base module A). If the adhesion module B) contains binders, they preferably comprise the same binders as were also selected for the base module A).

The adhesion module B) may also contain organic solvents and/or water together with further conventional coating additives and/or extenders. The organic solvents, further conventional coating additives and extenders comprise those as have already been stated above in the description of the base module A).

According to a preferred embodiment, the adhesion module B) contains binders in addition to the adhesion additive. Such binders here preferably comprise at least one of the binders which are also used in the base module A). The weight ratio of adhesion additive to binder in the adhesion module may, for example, be 0.4:1–1:3 (solid to solid).

The adhesion module B) is used as an additional component for the production of corresponding coating compositions. In the context of the modular system according to the invention, it is generally used when non-polar plastics which are known to be difficult to coat, such as for example polyolefins such as polypropylene or ethylene/propylene copolymers, are to be coated.

The elasticity module C) is a preparation which contains at least one elasticising component optionally together with conventional coating additives, extenders, organic solvents and/or water. The elasticising component comprises those binders and/or additives having an elasticising action, as are known to the person skilled in the art for the formulation of elastic coating compositions, in particular for coating plastics. Highly elastic polyesters and/or polyurethanes may be used as the elasticising component. Elastic polyesters and polyurethanes are those based on (cyclo)aliphatic linear or slightly branched unsaturated polyesters and polyurethanes. Elastic polyesters may be prepared for example of unsaturated (cyclo)aliphatic dicarboxylic acids and unsaturated (cyclo)aliphatic diols. Examples for suitable (cyclo)aliphatic dicarboxylic acids are hexahydrophthalic acid, cyclohexane-1,2- and -1,4-dicarboxylic acid, sebacic acid and adipic acid. Where they exist, the corresponding acid anhydrides may also be used. Examples for suitable (cyclo)aliphatic diols are 1,2-ethanediole, 1,4-butanediol, 1,6-hexanediol, 1,10-decanediol, cyclohexanediol, cyclohexanedimethanol. Trifunctional carboxylic acids or trifunctional polyols can be used to prepare slightly branched polyesters, for example trimethylol propane. Suitable polyesters have for example a hydroxyl value of 50 to 250, preferably of 60 to 200 mg KOH/g and a number average molecular mass of 500 to 3000, preferably 500 to 2000.

Elastic unsaturated polyurethanes may be prepared for example of (cyclo)aliphatic diisocyanates, for example hexamethylene diisocyanate, isophorone diisocyanate, and unsaturated (cyclo)aliphatic diols. Examples for suitable (cyclo)aliphatic diols are 1,2-ethanediole, 1,4-butanediol, 1,6-hexanediol, 1,10-decanediol, cyclohexanediol, cyclohexanedimethanol. The polyurethanes may also be functionalised, for example, with hydroxyl groups. They may have hydroxyl values of 50–250 mg of KOH/g.

The elastic resins may be used in a water-reducible or solvent-based form or they are free of water and organic solvents. Water-reducible resins contain ionic groups, for example acid groups, or nonionic groups in order to achieve sufficient water dilutability. Such highly elastic resins are known to the person skilled in the art. They are also commercially available, for example under the names Bayhydrol PT 241 (Bayer, aqueous polyester/polyurethane dispersion) or Desmophen 670 (Bayer, polyester containing hydroxyl groups, solvent-free). Preferably as elasticising component are used elastic resins based on (cyclo)aliphatic linear or slightly branched hydroxy-functional polyesters.

The organic solvents, conventional coating additives and extenders comprise those as have already been stated above in the description of the base module A).

The elasticity module C) is used as an additional component for the production of corresponding coating compositions. In the context of the modular system according to the invention, it is generally used when particular elasticity of the coating composition is required, for example when highly flexible plastics, for example plasticised PVC or PVC foils, are to be coated.

The binder module D) is a preparation which contains at least one binder, optionally together with conventional coating additives, water and/or organic solvents.

The binder module D) contains at least one water-dilutable or solvent-based binder. The binders here comprise those binders as have already been described above in the description of the base module A). The same binders as were also selected for the base module A) are preferably used in the binder module D). The binders indicated as preferred in the description of the base module A) are also used as preferred binders in the binder module D).

The binder module D) is combined with at least one of the other modules to yield a finished coating composition. Since, by virtue of its composition, the binder module D) is substantially used as a "let-down" component, it is preferably combined with the base module A) to yield a finished coating composition.

In addition to the modules A) to D) described above, the modular system according to the invention may additionally also contain at least one crosslinking agent module E).

The crosslinking agent module E) is a preparation which contains one or more crosslinking agents optionally together with organic solvents, water and/or conventional coating additives. Crosslinking agents should here be taken to be any compounds which are capable of entering into a chemical crosslinking reaction with at least one of the binders present in the modules A) to D). The nature of the crosslinking agent depends upon the nature and the functionality of the binders in the various modules A) to D). Compounds having hydroxyl, isocyanate, acetoacetyl, olefinically unsaturated groups, such as (meth)acryloyl groups, epoxy, carboxyl and amino groups, may be considered as crosslinking agents. Compounds with isocyanate groups, in particular with free isocyanate groups, are preferably used in accordance with the preferred functionality of the binders used in modules A) to D).

Compounds with isocyanate groups are, for example, any organic polyisocyanates with aliphatically, cycloaliphatically, araliphatically and/or aromatically bound free isocyanate groups. The polyisocyanates are liquid at room temperature or liquefied by the addition of organic solvents. The polyisocyanates generally have a viscosity at 23° C. of from 1 to 6000 mPas, preferably of above 5 and below 3000 mPas.

The polyisocyanates are preferably polyisocyanates or polyisocyanate mixtures with an average NCO functionality of 1.5 to 5, preferably of 2 to 3.

Particularly suitable are, for example, "coating polyisocyanates" based on hexamethylene diisocyanate (HDI), 1-isocyanato-3,3,5-trimethyl-5-isocyanatomethylcyclohexane (IPDI) and/or bis (isocyanatocyclohexyl)methane and per se known derivatives of these diisocyanates having biuret, allophanate, urethane and/or isocyanurate groups. Sterically hindered polyisocyanates, such as for example 1,1,6,6-tetramethylhexamethylene diisocyanate, 1,5-dibutylpentamethyl diisocyanate, p- or m-tetramethylxylylene diisocyanate and the corresponding hydrogenated homologues, are also highly suitable. These diisocyanates may also be reacted in a suitable manner to yield more highly functional compounds, for example by trimerisation or by reaction with water or trimethylolpropane.

Aromatic polyisocyanates are also suitable. Examples of these are polyisocyanates based on 2,4-diisocyanatotoluene or the mixtures thereof with 2,6-diisocyanatotoluene or based on 4,4'-diisocyanatodiphenylmethane and the trimerisation products thereof.

Further crosslinking agents usable in the crosslinking agent module E) are polyepoxides, for example aromatic epoxides based on bisphenol A, but also glycidyl-functional polymers such as for example glycidyl-functional poly (meth)acrylates. Blocked polyamines, for example poly- and/or diamines blocked with ketones or aldehydes are also suitable as crosslinking agents, as are carboxy-functional polyesters, polyurethanes and/or poly(meth)acrylates and polyfunctional carboxylic acids.

The equivalent ratio of the reactive functional groups of the binders in modules A) to D) to the complementarily reactive functional groups of the crosslinking agents in the module E) may preferably be 1:4–4:1, particularly preferably 1:2–2:1.

As a general rule, if a waterborne modular system is to be prepared, the individual modules contain water and optionally small quantities of organic solvents. If a solvent-based modular system is to be prepared, the individual modules contain organic solvents.

In general, when producing coating compositions using the modular system according to the invention, the coating composition A) is combined as required with at least one of modules B) to D) and optionally with module E). Only the base module AII) may preferably be used as a module by itself because it is already a finished coating composition and, in appropriate applications, does not need to be complemented by other modules. However, in the presence of crosslinkable binders, the base module AII) may be combined with the crosslinking agent module E).

The base module A) may, for example, be combined with the adhesion module B). This is generally case if it is desired to achieve the greatest possible versatility of the coating compositions produced with the modular system with regard to adhesion to the plastics substrate. Using the adhesion module is intended to ensure at least satisfactory adhesion onto all normally coatable plastics. This combination may moreover be used with good adhesion results for coating non-polar polyolefin substrates, for example polypropylene substrates.

The base module A) may furthermore, for example, be combined with the elasticity module C). This is generally the case if highly flexible plastics, for example plasticised PVC, PVC foil or flexible polyurethane foams, are to be coated.

The base module A) may furthermore, for example, be combined with the binder module D). This is generally the case if rigid plastics, such as glass fibre reinforced unsaturated polyesters, rigid polyurethane integral foams and solvent-sensitive plastics, such as ABS (acrylonitrile/butadiene/styrene copolymers) and polycarbonate are to be coated.

If necessary, the base module A) may also, for example, be combined as required with the adhesion module B) and the elasticity module C).

If modules A) to D) contain crosslinkable binders, the crosslinking agent module E) may generally be used for crosslinking.

The invention also relates to a process for the production of coating compositions for coating plastics using the modular system described above.

Coating compositions are produced using the modular system according to the invention by mixing together the individual modules which are stored as finished units. The mixing ratio of the individual modules relative to one another may here vary within relatively broad limits and is tailored to particular requirements. The mixing ratio of the individual modules may here be adjusted, for example, by volume, as is usual for example in repair paint shops. The modules may be stored in containers such as cans, canisters or bottles. The required proportions by volume may be added, for example, by means of measuring vessels provided with an appropriate graduated scale or advantageously by means of cone-top bottles or container closures provided with an appropriate graduated scale. Once added, the individual modules are vigorously mixed together. Organic solvents and/or water may optionally also be used to establish the required viscosity prior to application. It must be noted when using two-component binder/crosslinking agent systems, for example OH-functional binders and polyisocyanate crosslinking agents, that the crosslinking agent module E) may be mixed in only shortly before application.

Coating compositions produced using the modular system according to the invention are in particular used as primers or priming fillers for coating plastics. They are applied conventionally, preferably by spraying, onto the plastics substrates. The coatings are applied, for example, to a final dry film thickness of approx. 20–50 $\mu$m. Curing of the resultant coatings, optionally after a flash-off phase, proceeds preferably at temperatures of room temperature to 100° C., for example at 20 to 80° C., preferably at 20 to 60° C.

The primers may be overcoated with any desired conventional coating composition. They may, for example, be overcoated with conventional top coats. The topcoats may comprise single layer topcoats, for example based on two-component hydroxyacrylate/polyisocyanate systems, or conventional base coat/clear coat structures. The clear coats, but in particular single layer top coats, may optionally contain texture additives to achieve a textured surface. The primers may also be overcoated with conventional filler coating compositions before being topcoated. Overcoating may, in general, be performed with solvent-based or waterborne coating compositions.

Coating compositions produced using the modular system according to the invention may in particular be used as primers or priming fillers for coating plastics in vehicle and industrial coating operations. The modular system according to the invention is, however, in particular suitable for use in vehicle repair coating, for example in a paint shop. Using a limited inventory of module units, the system permits the efficient production of coating compositions for plastics coating which cover a wide range of applications without requiring a large product range to be held in stock and which meet the specified quality requirements for different grades of plastics.

The following Examples are intended to illustrate the invention in greater detail.

EXAMPLES

1. Production of Module Units

Module units of the composition stated below were produced:

| Constituent | Base Module A wt- % | Adhesion Module B wt- % |
|---|---|---|
| Water-dilutable amino- and hydroxy-functional methacrylate resin, 30% in water, prepared according to U.S. Pat. No. 5,665,434, example 1 | 45.0 | 47.0 |
| N-Methylpyrrolidone | 1.0 | 1.0 |
| Solvesso 150 (organic solvent) | 2.0 | 2.0 |
| Kristalloel 30 (organic solvent) | 2.0 | 2.0 |
| Conventional commercial hydroxy-functional elastic polyester, solvent-free (Desmophen 670, Bayer) | 4.0 | — |
| Deionised water | 9.0 | 8.0 |
| Conventional commercial defoamer (Agitan 315) | 0.6 | 0.6 |
| Conventional commercial dispersant (sodium salt of a naphthalenesulfonic acid condensation product, Metolat FC 530) | 0.4 | 0.4 |
| Barium sulfate | 5.0 | 3.0 |

-continued

| | | |
|---|---|---|
| Aluminium hydrosilicate | 17.0 | 11.0 |
| Titanium dioxide | 14.0 | 10.0 |
| Chlorinated polyolefin, 40% in xylene (CPO 343-1, Eastman) | — | 15.0 |
| Pigment/extender:binder ratio (solid:solid) | 2.1:1 | |
| Chlorinated polyolefin:binder ratio (solid:solid) | — | 0.4:1 |

| | |
|---|---|
| Elasticity module C: | conventional commercial hydroxy-functional elastic polyester, solvent-free (Desmophen 670, Bayer) |
| Binder module D: | water-dilutable amino- and hydroxy-functional methacrylate resin, 30% in water, prepared according to U.S. Pat. No. 5,665,434, example 1 |
| Crosslinking agent module E: | –75 wt % of an aliphatic polyisocyanate/solvent-free (Bayhydur 3100, Bayer) –25 wt % methoxypropyl acetate |

2. Production of Primers

Primers 1–3 of the composition stated below were produced from the module units produced above.

Primer 1:

4 parts by volume of base module A were mixed with 1 part by volume of binder module D. The resultant mixture was then vigorously mixed in a 4:1 ratio by volume with the crosslinking agent module E. Deionised water was then added in a proportion of 15 vol. % relative to the entire mixture and mixed in.

Primer 2:

1 part by volume of base module A was mixed with 1 part by volume of adhesion module B. The resultant mixture was then vigorously mixed in a 4:1 ratio by volume with the crosslinking agent module E. Deionised water was then added in a proportion of 15 vol. % relative to the entire mixture and mixed in.

Primer 3:

22 parts by volume of base module A were mixed with 1 part by volume of elasticity module C. The resultant mixture was then vigorously mixed in a 4:1 ratio by volume with the crosslinking agent module E. Deionised water was then added in a proportion of 15 vol. % relative to the entire mixture and mixed in.

3. Application of Primers 1–3

The primers produced above were each sprayed to a final dry film thickness of approx. 40 μm onto the plastics substrates stated below.

Primer 1: onto polycarbonate
Primer 2: onto polypropylene/ethylene/diene copolymers (PPEDM)
Primer 3: onto PVC foil.

After a flash-off phase of 10 minutes at room temperature, the coatings were each cured for 30 minutes at 60° C. The primer layers were then overcoated with a conventional commercial waterborne base coat (blue metallic Standohyd Basecoat, Standox GmbH) and conventional commercial clear coat (Standocryl-HS clear coat+30% elasticity additive+2-component HS curing agent, Standox GmbH) and cured for 30 minutes at 60° C.

Firmly adhering coatings having good surface appearance were obtained in each case. The Table below shows some selected coating results.

| Type of test | Specification | Primer 1 | Primer 2 | Primer 3 |
|---|---|---|---|---|
| Crosscut test | DIN EN ISO 2409 | GT 0–1 | GT 0–1 | GT 0–1 |
| Adhesion scratch test with pocket knife | * | K 1 | K 1 | K 1 |
| Steam jet test | VW test VW PV 1503 | 0 mm | 0 mm | 0 mm |
| Stone impact test | FORD BI 157-04 | Rating 1 | Rating 1 | Rating 1 |
| Bending test Condensed water test 240 h | ** DIN 50017 | — | — | No |
| Blistering after 24 h regeneration after condensed water test | DIN 53209 | BL m 0/ g 0 | BL m 0/ g | 0 BL m 0/ g 0 |

* K1 = very good; K2 = good; K3 = adequate; K4 = unsatisfactory
** Mandrel bending: mandrel diameter 60 mm, cracking yes/no

What we claimed is:

1. Modular system for the production of coating compositions for coating plastics comprising the following component modules:

A) at least one base module containing at least one binder, extenders and/or pigments, optionally, together with conventional coating additives, water and/or organic solvents, B) at least one adhesion module containing at least one adhesion-promoting component, optionally, together with conventional coating additives, extenders, organic solvents and/or water, C) at least one elasticity module containing at least one elasticizing component, optionally, together with conventional coating additives, extenders, organic solvents and/or water and D) at least one binder module containing at least one binder, optionally, together with additives, organic solvents and/or water.

2. Modular system according to claim 1 comprising additionally at least one crosslinking agent module E) comprising at least one crosslinking agent, optionally, together with conventional coating additives, organic solvents and/or water.

3. Modular system according to claim 1, wherein the binders in modules A) to D) comprise poly(meth)acrylate, polyester and/or polyurethane resins containing hydroxyl groups.

4. Modular system according to claim 1, wherein the adhesion-promoting component in the adhesion module B) comprises chlorinated polyolefins.

5. Modular system according to claim 1, wherein the elasticizing component in the elasticity module C) comprises elastic (cyclo)aliphatic linear or slightly branched unsaturated polyesters and/or polyurethanes.

6. Modular system according to claim 1, wherein the crosslinking agent module E comprises polyisocyanates with free isocyanate groups.

7. Modular system according to claim 1 comprising a modular system for forming primers for coating plastic substrates.

8. Modular system according to claim 1 comprising a modular system for forming aqueous coating compositions for coating plastic substrates.

9. Modular system according to claim 1 comprising a modular system for forming solvent-based coating compositions for coating plastic substates.

10. A process for forming coating compositions for coating plastic substrates using the modular system according to claim 1.

11. The process according to claim 10 comprising the forming of primers for coating plastic substrates.

12. The process according to claim 10 comprising the forming of coating compositions for vehicles.

13. The process according to claim 12 comprising the forming of coating compositions for vehicle repair coating.

\* \* \* \* \*